United States Patent
Kanouse et al.

[11] 3,931,983
[45] Jan. 13, 1976

[54] SNOW CYCLE
[75] Inventors: Roy E. Kanouse; Wayne F. Kanouse, both of Ludington, Mich.
[73] Assignee: The Raymond Lee Organization, Inc., New York, N.Y. ; a part interest
[22] Filed: Aug. 28, 1972
[21] Appl. No.: 284,438

[52] U.S. Cl. ............... 280/12.14; 180/9.24 A
[51] Int. Cl.² ........................ B62B 19/04
[58] Field of Search ......... 280/12.14, 12.13, 25, 28, 280/7.14, 10; 180/9.26, 10, 9.24 R, 9.24 A, 6 R

[56] References Cited
UNITED STATES PATENTS
| | | | |
|---|---|---|---|
| 1,399,624 | 12/1921 | Jaekel | 180/6 R |
| 3,336,037 | 8/1967 | Brozovich | 280/12.14 |
| 3,613,809 | 10/1971 | Chaumont | 280/21 R |

FOREIGN PATENTS OR APPLICATIONS
| | | | |
|---|---|---|---|
| 480,784 | 2/1952 | Canada | 280/12.14 |
| 834,491 | 11/1938 | France | 280/12.14 |

Primary Examiner—Philip Goodman
Assistant Examiner—John A. Carroll

[57] ABSTRACT

A tricycle for use in snow wherein the front wheel is replaced by a ski and the rear wheels are replaced by rotatable cylindrical drums having outwardly extending cleats.

1 Claim, 3 Drawing Figures

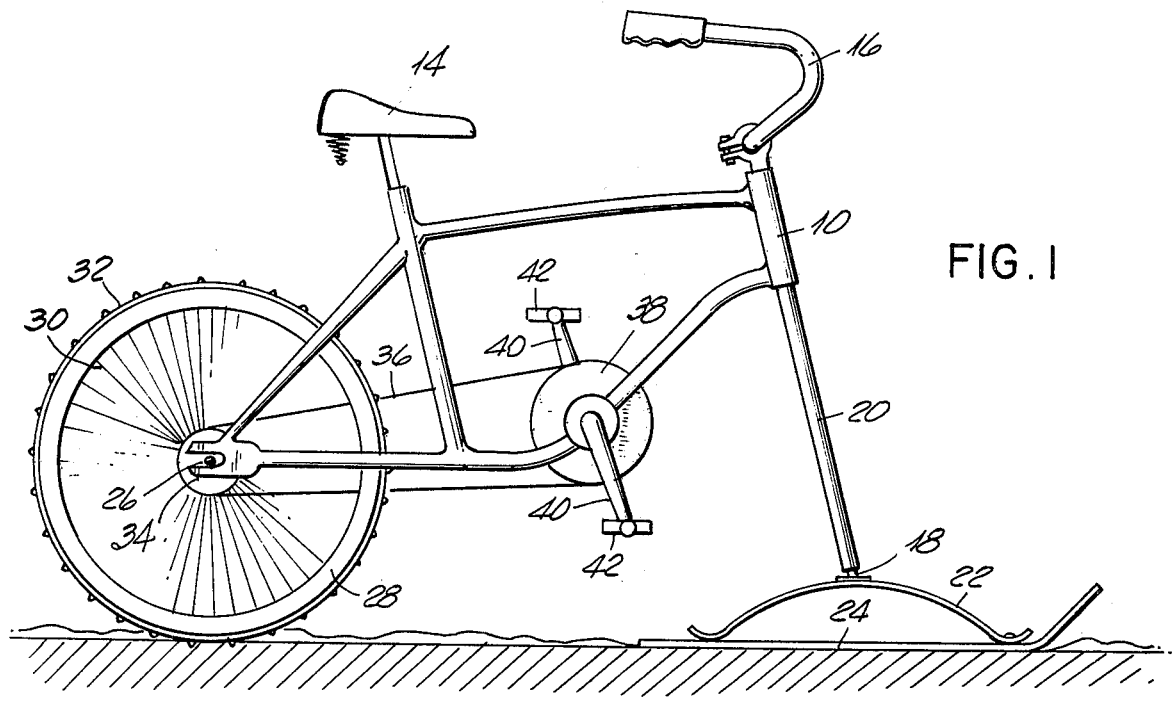
FIG. 1
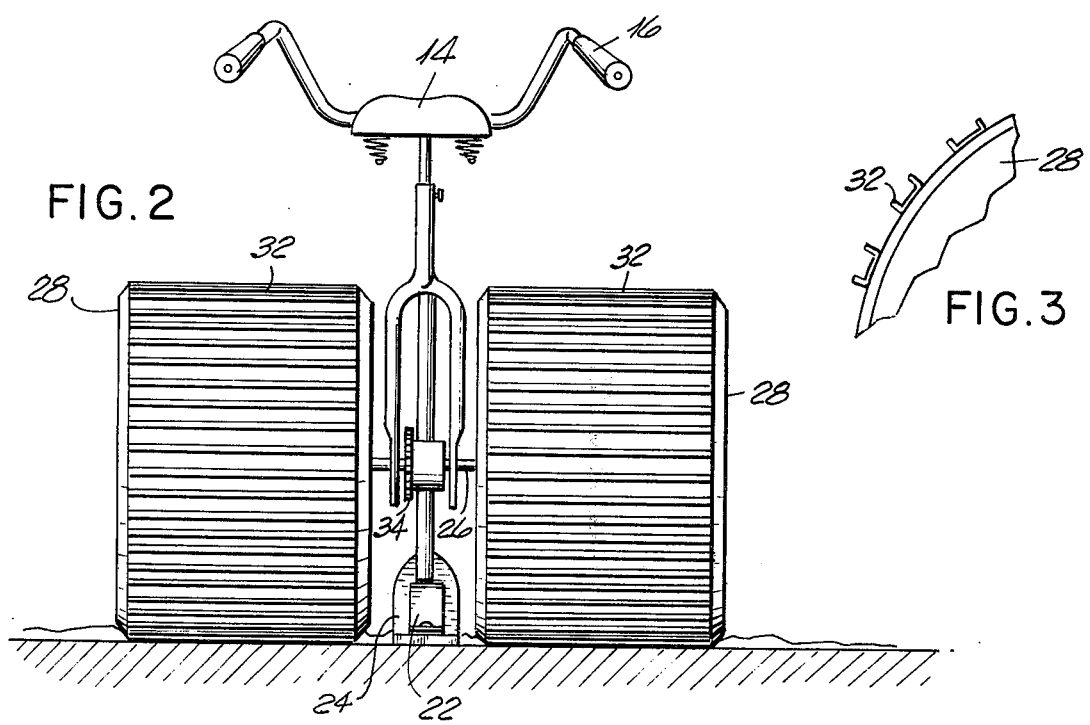
FIG. 2
FIG. 3

SNOW CYCLE

FIELD OF THE INVENTION

Our invention is directed toward a tricycle which can be used in snow by children or adults.

SUMMARY

To this end, we employ a tricycle with a foot pedal operated chain drive supplying power to a pair of rotatable cylindrical drums having outwardly extending cleats or other means for avoiding slippage in snow or ice. These drums replace the conventional rear wheels. In addition, the front wheel is replaced by a ski.

In use, the tricycle is propelled by foot pedal action, the user being seated in conventional manner and also steering in conventional manner by turning the ski as if it were a rear wheel.

BRIEF DESCRIPTION OF THE DRAWINGS:

In the drawings:

FIG. 1 is a side elevation of my invention in use;
FIG. 2 is a rear elevation thereof; and
FIG. 3 is a detail of a portion of the structure shown in the preceding Figures.

DETAILED DESCRIPTION OF PREFERRED EMBODIMENTS:

Referring now to FIGS. 1-2, a tricycle frame 10 supports a seat 14 and handle bars 16 connected to a shaft 18 extending inclinedly downwards rotatably in an external sleeve 20. The bottom of shaft is secured to a leaf spring 22 which, in turn, is secured to the top surface of a ski 24.

A horizontal axle 26 extends through two axially aligned cylinders 28 disposed on opposite sides of the frame, the axle extending at right angles to the frame and being rotatable therein.

The drums are hollow and open at both ends and are secured to the axle by spokes 30. The outer surface of each drum carries cleats 32 or other means for gripping in snow or ice.

A sprocket gear 34 on the axle between the drums is connected by chain 36 to a sprocket wheel 38. This wheel is turned by cranks 40 carrying foot pedals 42 which provide motive power as previously described.

While we have described our invention with particular reference to the drawings, such is not to be considered as limiting its actual scope.

Having thus described this invention, what is asserted as new is:

1. A snow cycle comprising:
   a tricycle frame with seat, handle bar steering, and foot pedal operated chain drive, said bar steering employing a downwardly inclined shaft;
   a leaf spring secured to the bottom of said shaft;
   a ski;
   said spring being secured to the top surface of said ski;
   a horizontal axle extending rotatably through the rear of the frame at right angles thereto;
   means connecting said drive to said axle to cause rotation of the same; and
   drum means disposed around said axle as a horizontal axis, said drum means rotating with said axle;
   said drum means including like cylinders disposed end to end in spaced position and having said axis in common;
   each of said cylinders having cleats on the outer surface for preventing slippage in snow and ice; and
   said cylinders being hollow and open at both ends and secured to said axis by spokes.

* * * * *